(12) United States Patent
Gerber et al.

(10) Patent No.: US 11,261,927 B2
(45) Date of Patent: Mar. 1, 2022

(54) ELECTRIC PARKING BRAKE WITH ACTIVE PISTON RETRACTION

(71) Applicant: ZF Active Safety US Inc., Livonia, MI (US)

(72) Inventors: Kraig Gerber, Plymouth, MI (US); Aaron Wahlfors, Hartland, MI (US)

(73) Assignee: ZF Active Safety US Inc., Livonia, MI (US)

( * ) Notice: Subject to any disclaimer, the term of this patent is extended or adjusted under 35 U.S.C. 154(b) by 141 days.

(21) Appl. No.: 16/785,064

(22) Filed: Feb. 7, 2020

(65) Prior Publication Data

US 2020/0256414 A1 Aug. 13, 2020

Related U.S. Application Data

(60) Provisional application No. 62/803,870, filed on Feb. 11, 2019.

(51) Int. Cl.
| | |
|---|---|
| *F16D 65/38* | (2006.01) |
| *F16D 55/226* | (2006.01) |
| *B60T 1/06* | (2006.01) |
| *B60T 13/74* | (2006.01) |
| *F16H 25/20* | (2006.01) |
| *F16D 65/18* | (2006.01) |
| *B60T 13/58* | (2006.01) |
| *F16D 127/02* | (2012.01) |
| *F16D 125/40* | (2012.01) |
| *F16D 121/24* | (2012.01) |

(52) U.S. Cl.
CPC .............. *F16D 65/38* (2013.01); *B60T 1/065* (2013.01); *B60T 13/58* (2013.01); *B60T 13/746* (2013.01); *F16D 55/226* (2013.01); *F16D 65/183* (2013.01); *F16H 25/20* (2013.01); *F16D 2065/386* (2013.01); *F16D 2121/24* (2013.01); *F16D 2125/40* (2013.01); *F16D 2127/02* (2013.01); *F16H 2025/2075* (2013.01)

(58) Field of Classification Search
CPC ...... F16D 65/38; F16D 65/183; F16D 55/226; F16D 2125/40; B60T 13/58; B60T 13/746; B60T 1/065
See application file for complete search history.

(56) References Cited

U.S. PATENT DOCUMENTS

| | | | |
|---|---|---|---|
| 9,145,120 B2* | 9/2015 | Burgoon | F16D 55/22655 |
| 2011/0308898 A1* | 12/2011 | Shiraki | F16D 65/567 |
| | | | 188/72.4 |
| 2014/0000990 A1* | 1/2014 | Shiraki | F16D 55/226 |
| | | | 188/71.8 |

(Continued)

*Primary Examiner* — Nishal R Sahni
(74) *Attorney, Agent, or Firm* — Robert James Harwood (57) ABSTRACT

An electric parking brake for a vehicle brake system includes a caliper, a piston, a spindle, an adjuster nut, a ring-like member affixed to the piston, and a biasing member. The piston may be disposed within a cavity of the caliper. The spindle is configured to drive the axial movement of the adjuster nut between a retracted position and an extended position via a threaded engagement wherein the adjuster nut is disposed within the piston. The biasing member may be disposed between the ring-like member and the adjuster nut so that, as the adjuster nut moves from an extended position to a retracted position which corresponds to a control signal, the biasing member urges the piston away from the rotor.

13 Claims, 4 Drawing Sheets

(56) References Cited

U.S. PATENT DOCUMENTS

| 2015/0053512 A1* | 2/2015 | Lee .................. F16D 65/58 |
| | | 188/72.3 |
| 2017/0016501 A1* | 1/2017 | Siegrist ............... F16D 55/226 |

* cited by examiner

ELECTRIC PARKING BRAKE WITH ACTIVE PISTON RETRACTION

CROSS-REFERENCE TO RELATED APPLICATIONS

This application claims priority to U.S. Provisional Patent Application No. 62/803,870, filed Feb. 11, 2019, the present disclosure of which is incorporated herein by reference in its entirety.

TECHNICAL FIELD

This present disclosure generally relates to vehicle disc brake assemblies, and in particular to an improved electric parking brake with active piston retraction.

BACKGROUND

Vehicle disc brakes are known from the prior art. Thus, for example, the document DE 10 2005 051 082 A1 and corresponding U.S. Pat. No. 8,322,495 B2, both of which are incorporated by reference herein in entirety, describes a corresponding disc brake, which is realized as a floating-caliper disc brake. In that case, a friction pad arrangement, having two opposing friction pads, is provided on both sides of a brake disc. The one brake pad is attached to a floating caliper, whereas the other brake pad can be displaced hydraulically, relative to the floating caliper, by means of an actuating piston. As a consequence of an application of hydraulic load to an actuating piston, the movable brake pad is displaced towards the brake disc. By means of the floating-caliper function, the brake pad that is solid with the floating caliper is drawn against the brake disc from the other side, in a manner known per se, such that a braking force acts upon the brake rotor on both sides. However, in this floating-caliper function, which has been known for a long time, this prior art also provides an electromechanical actuating device. This is used to realize a parking brake function. With appropriate control the disc brake can also additionally be actuated electromechanically.

When using a piston retractor, the running clearance may undesirably increase as the brake pad thicknesses decrease due to wear thereby undesirably increasing apply time and affecting fluid consumption. Running clearance is generally defined as the total "gap space" that exists between the caliper assembly (including brake pads) and the brake rotor. The present disclosure resolves this issue regarding increased brake apply time and fluid consumption.

SUMMARY

A feature of the present disclosure is to provide an active based retraction for a piston of the electric parking brake (EPB) mechanism which adjusts the retracted position of the piston as the brake pad thicknesses decrease. The basis of the retraction of the piston is dependent on the position of the adjuster nut of the EPB. In the present disclosure, the retracted position of the brake pads, which is set to a desired running clearance, is set by the position of the adjuster nut. Thus, periodic EPB applies are necessary to accommodate for brake pad wear. The present disclosure is configured to achieve the active based retraction of the piston by providing a spring-based retractor mechanism that reacts against the adjuster nut of the EPB and a circlip configured to be disposed within the piston.

In a first embodiment of the present disclosure, an electric parking brake for a vehicle brake system includes a caliper, a piston, a spindle, an adjuster nut, a ring-like member, and a biasing member. The biasing member may, but not necessarily, be provided in the form of a traditional spring or a wave spring. The piston may be disposed within a cavity of the caliper and a spindle driven by a motor actuated by a control signal. The adjuster nut may be disposed on the spindle via a threaded engagement wherein the spindle is configured to drive the axial movement of the adjuster nut between an extended position and a retracted position wherein the retracted position may be adjusted according to the control signal. The ring-like member may be affixed to an interior surface of the piston and the biasing member may be disposed between the ring-like member and a flange of the adjuster nut. Upon actuation of the spindle via the motor and a control signal, the adjuster nut may engage with the front end of the piston as the adjuster nut moves to an extended position thereby urging the piston toward the rotor. Similarly, upon actuation of the spindle via the motor and a control signal, the adjuster nut may move from the extended position to a retracted position wherein the biasing member urges the piston to move away from the rotor via the ring-like member which is affixed to the piston. The retracted position of the adjuster nut may be determined by a control signal which corresponds to a brake pad thickness.

The electric parking brake may further include a volume reducer which is affixed to the adjuster nut with the adjuster nut being disposed between the spindle and the volume reducer. The aforementioned volume reducer may provide a reaction support for the biasing member. Accordingly, the biasing member may be disposed between the volume reducer and the piston in a radial direction. Moreover, the biasing member may be disposed between the ring-like member and a flange of the adjuster nut in an axial direction. Alternatively, the biasing member may be disposed between the ring-like member and a flange of the volume reducer in an axial direction. The aforementioned ring-like member may be disposed within a groove defined in interior surface of the piston via a mechanical-fit engagement. The brake assembly may also optionally include a washer disposed between the ring-like member and the biasing member wherein the washer is configured to provide enhanced support for the biasing member. The aforementioned control signal which actuates the spindle via the motor also determines the retraction position of the adjuster nut according to the brake pad thickness.

In another embodiment of the present disclosure, an electric parking brake for a vehicle brake system includes a caliper, a piston, a spindle, a ring-like member, and a biasing member. The caliper may further include a pair of brake pad carriers disposed on each side of a brake rotor, each brake pad carrier supporting a brake pad. The piston may be disposed within a cavity of the caliper wherein the piston is configured to apply the brake pad to the brake rotor when the piston is in an extended position. The spindle may be disposed within the piston and the spindle may be configured to drive the axial movement of an adjuster nut between an extended position to a retracted position via a threaded engagement between the adjuster nut and the spindle. The ring-like member may be affixed to an interior surface of the piston and the biasing member is disposed between the ring-like member and a flange of the adjuster nut. Accordingly, the biasing member and the ring-like member couple the piston to the adjustment nut when the adjustment nut moves from the extended position to the retracted position such that the biasing member urges the piston away from the brake rotor via the ring-like member.

With respect to the second non-limiting example embodiment, the interior surface of the piston may define a groove which is configured to receive the ring-like member via a mechanical-fit engagement. Moreover, the second embodiment may further optionally include a volume reducer which is disposed between the adjuster nut shaft and the piston such that the volume reducer is affixed to the adjuster nut shaft.

Other advantages of this present disclosure will become apparent to those skilled in the art from the following detailed description of the preferred embodiments, when read in light of the accompanying drawings.

BRIEF DESCRIPTION OF DRAWINGS

Like reference numerals refer to like parts throughout the description of several views of the drawings.

DETAILED DESCRIPTION

Figure 1A:
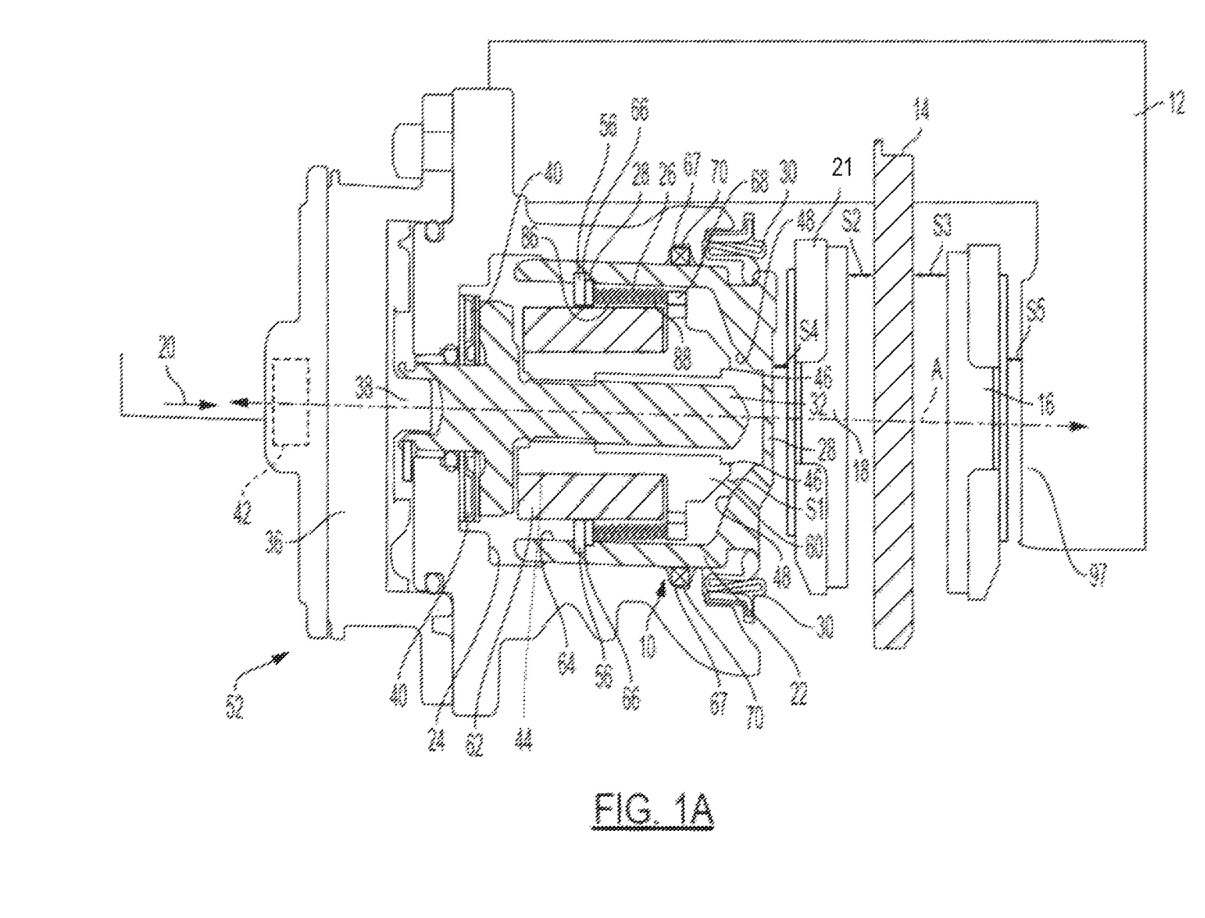
FIG. 1A is a first view of a first embodiment of the present disclosure in accordance with a first embodiment of the present disclosure where the piston is in the partially retracted position.
Figure 1B:
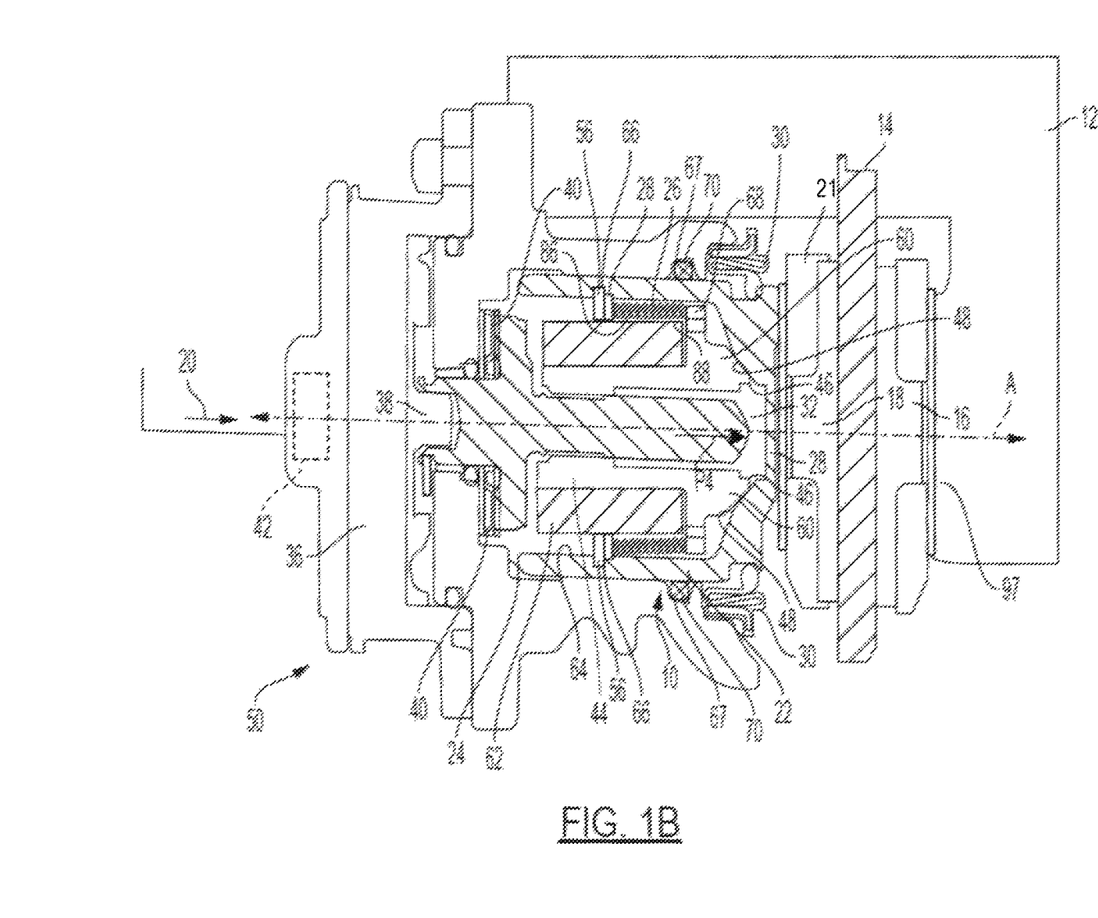
FIG. 1B is a second view of a first embodiment of the present disclosure in accordance with a first embodiment of the present disclosure where the piston is in the extended position.

FIGS. 1A-1B illustrate a brake assembly 10, with an electric park brake (EPB) mechanism, having an active based piston retraction mechanism in accordance with the present disclosure. As shown therein, the brake assembly 10 includes a (first) outboard brake pad 16, a brake rotor 14 (or disc 14), a (second) inboard brake pad 18, and an EPB mechanism. The EPB mechanism may also include at least a spindle 32, an adjuster nut 60, an optional volume reducer 62, and an axially moveable piston 22. As shown, the optional volume reducer 62 may be disposed between the shaft 44 of adjuster nut 60 and the interior surface of the piston. The optional volume reducer 62 is affixed to the adjuster nut 60 and moves together with the adjuster nut 60. The optional volume reducer 62 may function as a reaction support for the biasing member 26. The volume reducer 62 may also additionally function as an anti-rotation device for the adjuster nut 60 when used on larger pistons.

Therefore, upon actuation of the spindle 32 via the motor 42 and a control signal 20, the adjuster nut 60 may engage with surface 48 on the front end 28 of the piston 22 as the adjuster nut 60 moves to an extended position 50 thereby urging the piston 22 toward the rotor 14 (see FIG. 1B). Similarly, upon actuation of the spindle 32 via the motor 42 and a control signal 20, the adjuster nut may also move from the extended position 50 (FIG. 1B) to a retracted position 52 (FIG. 1A) wherein the biasing member 26 urges the piston 22 to move away rotor 14 via the ring-like member 56 which is affixed to the piston 22. In the retracted position 52 shown in FIG. 1A, a particular biasing member 26 may be used such that the retracted position 52 is provided as shown. However, a "stronger biasing member" may alternatively be used causing the piston 22 to be further retracted away from the rotor until the piston contacts the nut. The retracted position 52 of the adjuster nut 60 may be determined by a control signal 20 which corresponds to a brake pad thickness. That is, as the brake pad thickness 82 decreases, the retracted position 52 of the adjuster nut 60 may gradually shift towards the rotor 14.

Given that the piston 22 is coupled to the adjuster nut 60 when the adjuster nut moves from the extended position 50 to the retracted position 52 as explained above, the retracted position 52 of the piston 22 along axis A (shown in FIGS. 1A and 2) may adjust (towards the rotor 14, together with the adjuster nut 60) as brake pad thickness 82 decreases. As explained herein, the adjuster nut 60 is configured to translate along axis A (toward the rotor 14) via the adjuster nut's threaded engagement with the spindle 32 as the brake pad thickness 82 decreases due to wear so as to maintain a predetermined running clearance (S2+S3+S4+S5) despite the decreasing thickness 82 of the brake pads 16, 18 due to wear. Referring to FIG. 1A, the running clearance (S2+S3+S4+S5) is the sum of air gaps S2, S3, S4, S5 which exist between the finger 97 and the front end 28 of the piston 22. Therefore, in the non-limiting example of FIG. 1A, the running clearance is the sum of distance S2, S3, S4, S5 wherein S2 and S3 constitute the "air gaps" that exist between the finger 97 and the front end 28 of the piston 22. The adjuster nut 60 (and the optional volume reducer 62) changes its axial retracted position along axis A, together with the piston 22.

Accordingly, the adjuster nut 60 repositions the retracted position of the piston 22 (as the brake pads 16, 18 wear down) so that the time to apply the EPB mechanism (apply the brake pads 16, 18 to the brake rotor 14) does not increase as the brake pads 16, 18 wear down given that the running clearance (S2+S3+S4+S5 in FIG. 1A) is maintained despite the decreasing thickness 82 of the brake pads 16, 18. Moreover, fluid consumption, under a hydraulic apply condition, is not affected despite the decreasing thickness 82 of the brake pads 16, 18. Thus, the various embodiments of the present disclosure are accordingly configured to achieve the active based retraction of the piston 22 by providing a biasing member 26 which reacts against a flange 68 of the adjuster nut 60 (or a volume reducer 62) of the EPB and a circlip ring-like member 56 affixed to the piston 22.

Figure 2:
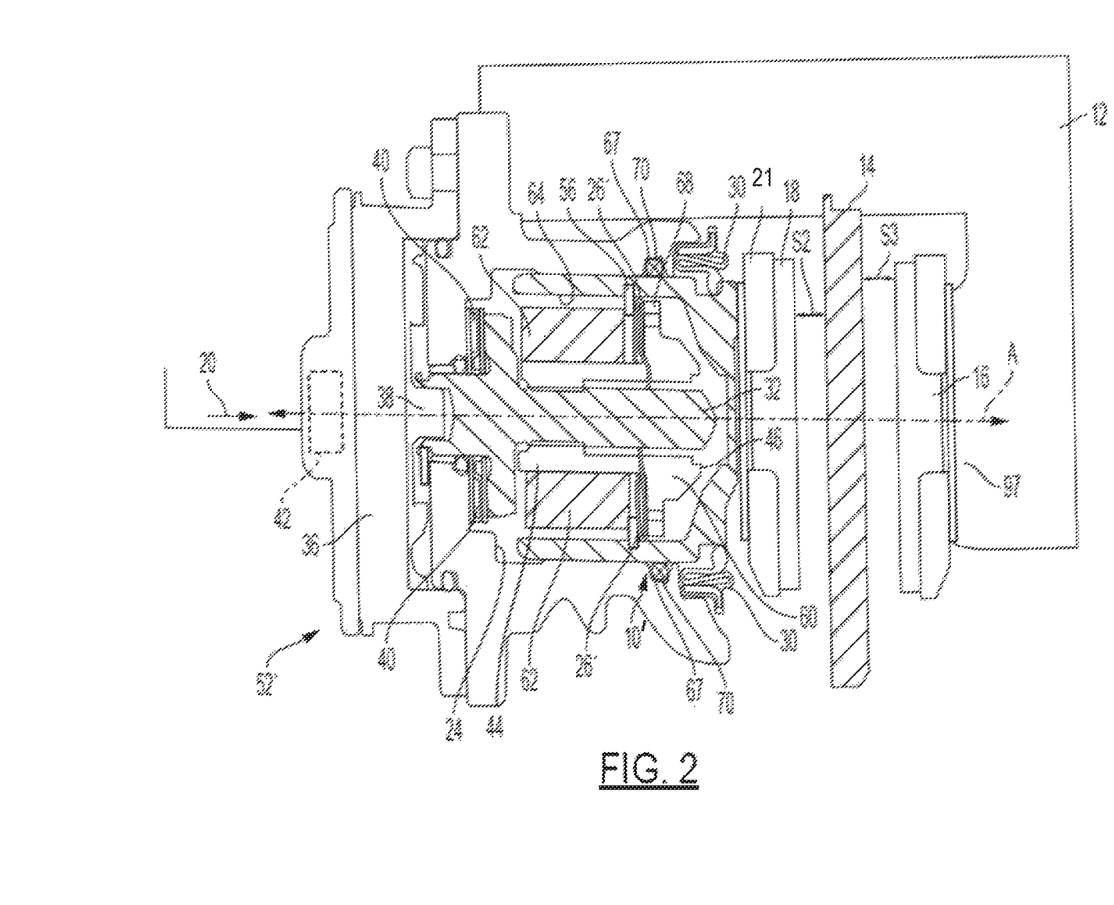
FIG. 2 is a view of a second embodiment of brake assembly wherein the biasing member is a wave spring and the piston and adjuster nut are in the partially retracted position.

As shown in FIGS. 1A-1B and 2, the ring-like member 56 is affixed to the piston 22 while a biasing member 26, such as a compression spring 26 (FIGS. 1A-1B) or similar member such as the wave spring 26' (FIG. 2), may supported by the ring-like member 56 and either a flange 68 of the adjuster nut 60 or a flange 69 of the volume reducer 62 on the side of the biasing member 26 which is opposite the ring-like member 56—along axis A. Therefore, a first end 86 of the biasing member 26 may be adjacent to the ring-like member 56 and a second end 88 of the biasing member 26 may be adjacent to the flange 68 of the adjuster nut 60. However, with reference to the radial direction, the biasing member 26 may be disposed between the optional volume reducer 62 and the piston 22 wherein the volume reducer 62 provides a reaction support for the biasing member 26.

Figure 3:
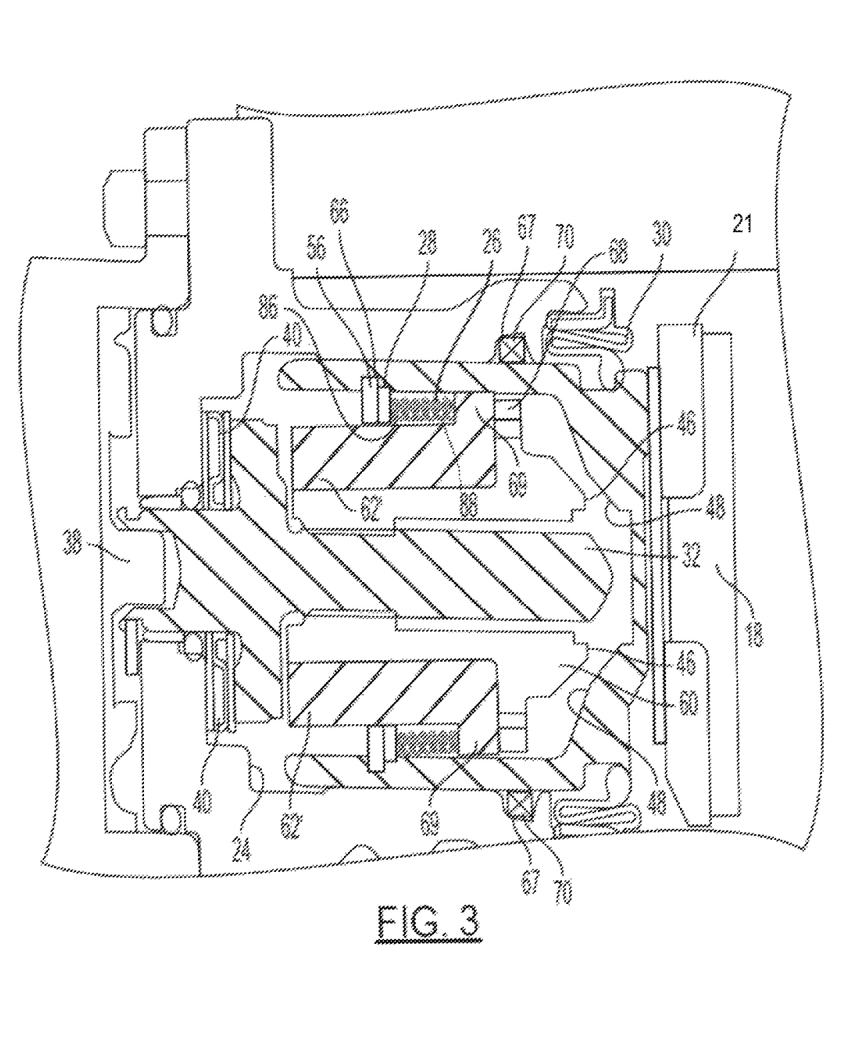
FIG. 3 illustrates a partial cross-sectional view of an example EPB based active piston retraction assembly wherein the biasing member is disposed between a flange of the volume reducer and the ring-like member.

With reference to the partial view shown in FIG. 3, an alternative embodiment of the disclosure is shown where the biasing member 26 may be disposed between the ring-like member 56 and a flange 69 of the optional volume reducer 62'. In this alternate embodiment, the first end 86 of the biasing member 26 may be adjacent to the ring-like member 56 and the second end 88 of the biasing member 26 may be adjacent to the flange 69 of the volume reducer 62'.

Referring now to FIG. 2, a wave spring 26' may be implemented and disposed between the ring-like member 56 and the flange 68 of the adjuster nut 60 (instead of spring 26 of FIGS. 1A-1B). In operation, upon release of the EPB mechanism, the biasing member 26 of FIG. 1 or the wave spring 26' of FIG. 2 is configured to provide an active retraction of the piston 22 of the EPB as further explained herein. Moreover, with respect to the various embodiments of the present disclosure, an optional washer 58 (shown in FIG. 1A-1B) or similar member may be configured to be provided between the ring-like member 56 and the biasing member 26 (FIGS. 1A-1B) or wave spring 26' (FIG. 2). The optional washer 58 provides further structural support for the biasing member 26 or spring 26' when needed. Given that many circlips 56 have a varying radial cross-section, and are not covering a full 360 degree support, the optional washer 58 addresses any structural stability issues which might exist in the event a circlip is used alone with the spring. It is further understood that the optional washer 58 may be integral to the biasing member 26.

The adjuster nut 60 may include an adjuster nut shaft 44 and a flange 68 extending from the adjuster nut shaft 44. The adjuster nut 60 may be threaded onto the spindle 32 within the piston 22. The adjuster nut 60 may be configured to adjust the retraction position (52 in FIG. 1A) of the piston 22 as a brake pad thickness 82 decreases due to wear and tear. The ring-like member 56 may be affixed to an interior surface 64 of the piston 22 and the biasing member 26 may be disposed between the ring-like member 56 and a flange 68 the adjuster nut 60. Similar to the earlier embodiment, the wave spring 26' may alternatively abut a flange 69 of the volume reducer 62' (flange 69 of volume reducer shown in FIG. 3).

Referring back to FIGS. 1A-1B, the first embodiment disc brake arrangement 10 according to the present disclosure is represented in a partial sectional view. This disc brake arrangement 10 includes a brake caliper 12 and a brake rotor 14 which is coupled to a vehicle wheel in a rotationally fixed manner. Brake pads 16, 18 are affixed to the brake caliper 12. The brake carrier 21 supports a brake pad 18 which is applied to the rotor 14 when the piston 22 advances toward the rotor 14 and applies a force to the brake pad carrier 21.

As shown in the release position in FIG. 1A, the piston 22 and the adjuster nut 60 have moved away from the rotor 14. It is understood that the two brake pads 16 and 18 may be disposed with small air clearances S2 and S3 on both sides of the brake rotor 14 created as a result of the actuation of the pad retractors/clip (not shown) after the adjuster nut 60 and the piston 22 have moved to the retracted position. As such, no significant residual drag moments occur between each brake pad 16, 18 and the brake rotor 14.

Referring now to the caliper cavity 24 proximate to the brake rotor 14, there is a full-perimeter receiving groove 67 defined in the caliper 12, in which an annular sealing element 70 is accommodated. In one non-limiting example, the sealing element 70 may have a cross-shaped or an X-shaped contour in cross section, and has the property of keeping the friction low in respect of the piston 22 as the latter is displaced along the longitudinal axis A. In addition, it can be seen in FIGS. 1A-1B and 2, the piston 22 may be provided with a full-perimeter bellows 30, which prevents dirt from being able to enter the region between the piston 22 and the full-perimeter wall defining the receiving cavity 24 of the brake caliper 12.

As can be seen in FIGS. 1A-1B and 2, the piston 22 may have a hollow configuration. Accommodated in the hollow piston 22, there is the spindle 32 from the electromechanical actuating arrangement. The electromechanical actuating arrangement includes a drive assembly 36 having an electric motor 42 and a transmission arrangement where the electric motor 42 and transmission arrangement are disposed outside of piston 22. An output shaft 38 of this drive assembly 36 drives the spindle 32 to rotate wherein the spindle 32 is supported via an axial bearing 40. The spindle 32 is configured to drive the translation of the adjuster nut 60 along axis A via the spindle's 32 threaded engagement with the adjuster nut 60. In the portion of the spindle 32 which is proximate to the brake rotor 14 in FIGS. 1A-1B and 2, the spindle 32 has a substantially conical portion. Similarly, the adjuster nut 60 has a substantially conical portion 46 which is configured to abut the inner surface 48 of the piston 22 and drive the piston 22 toward the rotor 14 along axis A. In the release position shown in FIG. 1A, a clearance S1 may or may not between exist between the adjuster nut 60 and the piston surface 48—depending upon the spring load of the particular biasing member 26.

As shown in FIGS. 1A-B and 2, a ring-like member 56 is affixed to the interior surface 64 of the piston 22. The ring element 56 may, but not necessarily, be made of an elastomer material. As shown in the various embodiments of FIGS. 1A-1B and 2, the ring element 56 may be accommodated in an interior groove 66 of the piston 22 via a mechanical engagement. The ring-like member 56 may, but not necessarily, have a slightly larger outer diameter 74 than the inner diameter 72 of the piston 22. The ring-like member 56 may bear on the inner circumferential surface 64 or an interior groove 66 of the piston 22 with a mechanical fit. The groove 66 defined in the piston 22 is configured to put the circlip 56 or ring-like member 56 into shear.

Therefore, in the positions shown in FIGS. 1A and 2, the ring-like member 56, owing to the mechanical engagement with the piston 22 mentioned previously, retains the piston 22 against a movement towards the brake rotor 14, in the axial direction A as the biasing member 26 urges piston 22 away from the rotor 14 at the ring-like members connection with the piston 22. Accordingly, once the piston 22 has been retracted via the translation of the adjuster nut 60 away from the rotor 14, there are no significant residual drag moments which result in excessive wear on the brake pads 16, 18 or in increased fuel consumption given that the piston 22 is no longer applying the brake pad 18 to the rotor 14.

Therefore, as indicated the retraction function for piston 22 is achieved by means of the arrangement between the ring-like member 56, biasing member 26 (FIGS. 1A-1B) (or wave spring 26' of FIG. 2) and the adjuster nut 60 wherein the adjuster nut 60 is configured to retract away from the rotor 14 as a result of an control signal 20 via the adjuster nut's threaded engagement with the spindle and the retraction of the adjuster nut 60 causes the piston 22 retract. However, the retracted position 52 of the adjuster nut is adjusted towards the rotor 14 as the thickness 82 of brake pads 16, 18 decrease over time due to wear. As a result of the adjustment to the retracted position 52 of the adjuster nut 60 and the piston 22, the running clearance (S2+S3+S4+S5) in the initial state according to FIGS. 1A and 2 is held substantially constant (in the release position) due to a software-controlled adjustment of the adjuster nut 60.

With respect to the first embodiment of the present disclosure where a biasing member 26 is provided, FIG. 1B shows a state in which, starting from the release position according to FIG. 1A, a purely electromechanical actuation is affected. In this case, control of the electromechanical actuating device 34 causes the spindle 32 to rotate thereby displacing the adjuster nut 60 (and the optional volume reducer 62) towards the rotor 14 along axis A (via the adjuster nut's 60 threaded engagement with the spindle). As the adjuster nut 60 translates toward the rotor 14, the adjuster nut 60 abuts and moves the piston 22 (and brake pad 18) towards the rotor 14 according to arrow P4 to achieve a parking brake action. When the EPB is actuated, the ring-like member 56 is not subject to elastic deformation as the piston 22 advances towards the disc 14.

When the parking brake is released in a purely electromechanical manner, the adjuster nut '60 moves away' from the rotor 14 along axis A via the adjuster nut's 60 threaded engagement with the spindle 32 (in response to an electric signal). As a result, the piston 22 is actively retracted away from the rotor 14 given that the piston 22 is coupled to the adjuster nut 60 via the ring-like member 56 and the biasing member 26—until ultimately, the piston 22 reverts to the piston's initial state according to FIG. 1A has been attained.

Similarly to the retraction of biasing member 26 of FIGS. 1A-1B, wave spring 26' of FIG. 2 may urge piston 22 away from rotor 14. As indicated, in this second embodiment, the brake assembly 10' includes wave spring 26' or similar member, (instead of biasing member 26 disclosed in FIGS. 1A-1B) wherein the wave spring 26' is configured to be disposed between the ring-like member 56, adjuster nut 60, and the piston 22. In operation, upon release of the EPB mechanism the wave spring 26' is configured to similarly provide an active retraction of the piston 22 of the EPB such that the wave spring 26' urges the retraction of the piston 22 as the adjuster nut 60 translates along axis A away from rotor 14. The wave spring 26' of the second embodiment in FIG. 2 differs from the spring 26 of the first embodiment of FIGS. 1A-1B in that the wave spring 26' is a lower displacement spring. The longer displacement biasing member 26 of FIGS. 1A-1B in the first embodiment is particularly helpful to attain the desired EPB apply.

Accordingly, the present disclosure provides an electric parking brake for a vehicle brake system includes a caliper 12; a piston 22 disposed within a cavity 24 of the caliper 12; a spindle 32, an adjuster nut 60, a ring-like member 56, and a biasing member 26, 26'. The rotation of the spindle 32 may be configured to drive the axial movement of the adjuster nut 60 and accordingly, the piston 22 between an extended position 50 (shown in FIG. 1B) and a retracted position 52, 52' (shown in FIGS. 1A and 2 respectively) via the axial translation/displacement of the adjuster nut 60 between the extended 50 and retracted positions 52, 52'.

In accordance with the provisions of the patent statutes, the principle and modes of operation of this present disclosure has been described and illustrated in its preferred embodiments. However, it must be understood that this present disclosure may be practiced otherwise than as specifically explained and illustrated without departing from its spirit or scope.

What is claimed is:

1. An electric parking brake for a vehicle brake system comprising:
    a caliper;
    a piston disposed within a cavity of the caliper;
    a spindle driven by a motor;
    an adjuster nut disposed on the spindle via a threaded engagement and the spindle being configured to drive the axial movement of the adjuster nut between an extended position and a retracted position;
    a ring-like member affixed to an interior surface of the piston; and
    a biasing member having a first end adjacent the ring-like member and a second end axially movable with the adjuster nut such that an axial spacing between the first end and the ring-like member and an axial spacing between the second end and the adjuster nut is constant during movement of the adjuster nut between the extended position and the retracted position;
    wherein the adjuster nut engages with a front end of the piston in the extended position to urge the piston toward the rotor, and when the adjuster nut moves from the extended position to the retracted position, the biasing member urges the piston to move away from the rotor and the retracted position of the adjuster nut is determined by a control signal and a brake pad thickness.

2. The electric parking brake as defined in claim 1 further comprising a volume reducer affixed to the adjuster nut with the adjuster nut being disposed between the spindle and the volume reducer.

3. The electric parking brake as defined in claim 2 wherein the volume reducer is configured to provide a reaction support for the second end of the biasing member axially opposite from the ring-like member.

4. The electric parking brake as defined in claim 3 wherein the ring-like member is disposed within a groove defined in interior surface of the piston via a mechanical-fit engagement.

5. The electric parking brake as defined in claim 1 wherein the control signal is configured to determine a retraction position of the adjuster nut according to the brake pad thickness.

6. The electric parking brake as defined in claim 1 further comprising a washer disposed between the ring-like member and the biasing member wherein the washer is configured to provide enhanced support for the biasing member.

7. The electric parking brake as defined in claim 2 wherein the biasing member extends axially between the volume reducer and the piston.

8. The electric parking brake as defined in claim 7 wherein the biasing member is disposed between the ring-like member and a flange of the adjuster nut.

9. The electric parking brake as defined in claim 7 wherein the biasing member extends axially between the ring-like member and a flange of the volume reducer.

10. The electric parking brake as defined in claim 8 wherein the biasing member is a wave spring.

11. An electric parking brake for a vehicle brake system comprising:
    a caliper having a pair of brake pad carriers disposed on each side of a brake rotor, each brake pad carrier supporting a brake pad;
    a piston disposed within a cavity of the caliper, the piston being configured to apply the brake pad to the brake rotor when the piston is extended;
    a spindle disposed within the piston and driving the axial movement of an adjuster nut between an extended position to a retracted position via a threaded engagement between the adjuster nut and the spindle;
    a ring-like member affixed to an interior surface of the piston;
    a biasing member having a first end adjacent the ring-like member and a second end axially movable with a flange of the adjuster nut such that an axial spacing between the first end and the ring-like member and an axial spacing between the second end and the adjuster nut is constant during movement of the adjuster nut between the extended position and the retracted position;

wherein the biasing member and the ring-like member couple the piston to the adjustment nut when the adjustment nut moves from the extended position to the retracted position such that the biasing member urges the piston away from the brake rotor.

12. The electric parking brake as defined in claim 11 wherein the interior surface of the piston defines a groove which is configured to receive the ring-like member via a mechanical-fit engagement.

13. The electric parking brake as defined in claim 11 further comprising a volume reducer disposed between a shaft of the adjuster and the piston and affixed to the adjuster nut shaft.

* * * * *